June 17, 1958 J. C. PYLE 2,839,745

APPLIANCE FOR EASE OF HANDLING AND PROTECTION OF PARTS OF A TELEVISION CHASSIS DURING TRANSPORTATION, REPAIR AND TESTING OF THE SAME

Filed June 7, 1954 2 Sheets-Sheet 1

INVENTOR
John C. Pyle

BY Lancaster, Allwine & Rommel
ATTORNEYS

APPLIANCE FOR EASE OF HANDLING AND PROTECTION OF PARTS OF A TELEVISION CHASSIS DURING TRANSPORTATION, REPAIR AND TESTING OF THE SAME

Filed June 7, 1954 2 Sheets-Sheet 2

INVENTOR
John C. Pyle

BY Lancaster, Allwine & Rommel
ATTORNEYS

United States Patent Office 2,839,745

Patented June 17, 1958

2,839,745

APPLIANCE FOR EASE OF HANDLING AND PROTECTION OF PARTS OF A TELEVISION CHASSIS DURING TRANSPORTATION, REPAIR, AND TESTING OF THE SAME

John C. Pyle, Denver, Colo.

Application June 7, 1954, Serial No. 435,021

6 Claims. (Cl. 340—367)

This invention relates to an improved appliance or tool adapted for detachable connection to a television chassis for ease of its handling during transportation, repairing and testing of the parts thereof, and including means for protection of its picture tube.

It is well known in the art relating to the handling and servicing of television chassis that the frame of the chassis and the picture tubes are so positioned as to make it difficult for a serviceman to properly support the chassis and efficiently repair the parts thereof. It is also well known that the picture tubes of television chassis are very susceptible to damage by reason of the fact that they are not properly protected for transportation and servicing. It is therefore a primary purpose of this invention to provide an appliance for detachable connection to television chassis frames in order that the chassis may be placed upon its side, in inverted position, or in various other supported well stabilized positions for proper access to the parts thereof and ease of servicing the same. This appliance may include means for protecting the neck portion of the picture tube against damage under transportation and servicing conditions.

A further object of this invention is the provision of an improved tool or appliance adaptable for detachable connection to television chassis of various sizes so that the same may be adjusted to the size of the chassis and the screen and other portions of the picture tube whereby it may serve as a handle for carrying the television chassis, or as means for stably supporting the chassis and picture tube in any of various side or inverted positions, in order that a serviceman may have proper working access to the parts of the chassis.

Other objects and advantages of the invention will be apparent during the course of the following detailed description.

In the accompanying drawings, forming a part of this specification, and wherein similar reference characters designate corresponding parts throughout the several views.

Figure 1:
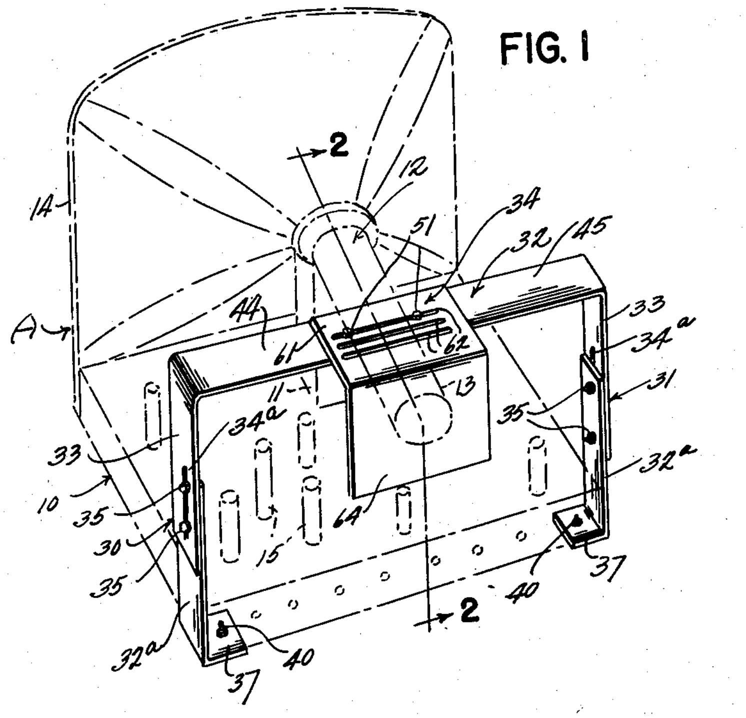
Fig. 1 is a perspective view, showing in dot and dash lines the conventional televison chassis and in full lines the improved appliance B connected thereto.

In the drawings, wherein for the purpose of illustration are shown preferred and modified forms of the invention, the letter A may generally designate a television chassis having the improved appliance or tool B detachably connected therewith.

Television chassis vary in shape, size and arrangement of parts, but in the main each of them includes a base frame 10 having means 11 thereon for supporting a picture tube 12. The neck portion 13 extends rearwardly over the chassis frame 10 in parallelism thereabove, with the screen 14 supported on the forward part of the chassis frame 10. In addition the chassis frame 10 (usually square or rectangular in plan view) supports other component parts 15, such as small tubes, transformers, condensers, resistors and the like. The frame 10 usually has side walls 20 and 21 provided with base flanges 22 and 23 respectively. The rear and forward portions of the frame may also include similar walls and flanges.

The most acceptable position for supporting the chassis when removed from the television cabinet is upon its side. This gives proper access to the parts to be tested or repaired. It is usual, under such circumstances, to prop the tube neck with some kind of block or support. It is not uncommon to have the block become dislodged, resulting in the entire assembly tilting, with the possibility of breaking the picture tube neck or other chassis parts.

In order to obviate the disadvantages of transportation and servicing of television chassis I have provided the approved appliance or tool B for quick detachable connection to the rear portion of the chassis frame 10, in order that it may serve as a handle for removal of the frame from the television cabinet and the transportation of the chassis, and for the support of the chassis in any of various positions for ease of access for repair and testing of the parts thereof. It includes side walls 30 and 31 and a top wall supporting construction 32. Optionally, a picture tube neck protecting hood 34 may be provided.

Each of the sides 30 and 31 and the top 32 may be lengthwise adjusted for the purpose of adaptation to the size of the television chassis, in order to properly locate the sides 30 and 31 with respect to the sides of the chassis frame and screen 14, and the top wall 32 with respect to the height of the screen portion 14 of the picture tube 12.

Each of the side constructions 30 and 31 include complementary strips or portions 32[a] and 33; the latter being slotted at 34 to detachably and adjustably receive therein nuts or bolts 35 which may be supported by the strips 32[a]. This enables lengthwise adjustment of the side structures 30 and 31 in order to properly place the top wall or handle structure 32 flush with or in proper supporting relation with respect to the top of the screen portion 14 of the picture tube, as will be noted from Figs. 2 and 3 of the drawings. The lower ends of the side portions 32 are flanged inwardly at 37 for underlying the flanges 22 and 23 of the chassis frame. These flanges 37 support bolts 40 by means of which they may be attached under and to the flanges 22 and 23 to vertically support the side portions 30 and 31 at the outer sides of the chassis frame 10, in the relation shown in the drawings.

The top handle or supporting wall structure 32 includes complementary parts or rail portions 44 and 45, preferably integrally connected to and extending in right angled relation from the side portions 33. The adjacent ends of the portions 44 and 45 overlap, and one of these portions (44) is preferably provided with an elongated slot 50 therein, and the other portion (45) is preferably provided with bolts 51 adapted to detachably extend through the slot 50 in order to bolt the portions 44 and 45 together, and to provide for their relative adjustment lengthwise in order to properly space the side supporting portions 30 and 31 according to the width of the television chassis frame.

It will be noted that the upper supporting portion 32 of the tool B lies above and in spaced relation with respect to the neck 13 of the tube and the sides 30 and 31 are also spaced from neck 13.

Figure 2:
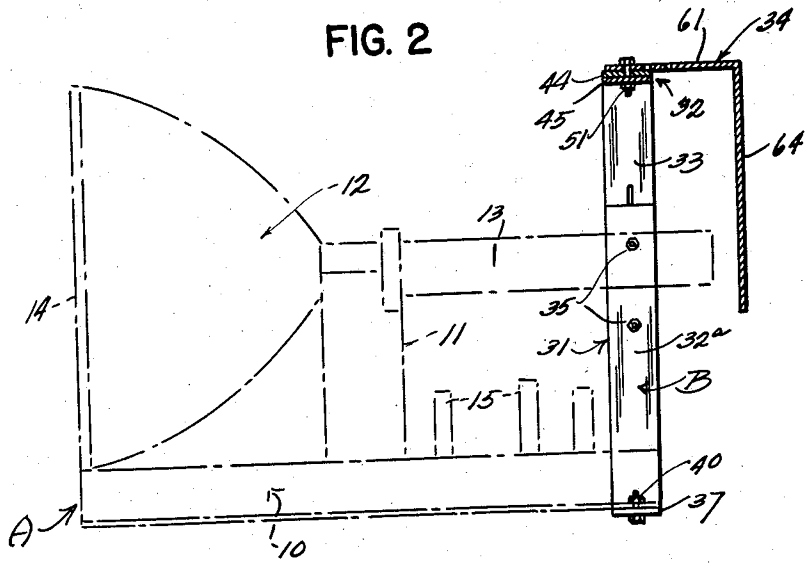
Fig. 2 is a cross sectional view taken through parts A and B as shown in Fig. 1, substantially on the line 2—2 of Fig. 1.

As a further precautionary measure I prefer to provide the hood 34. It may consist of a top plate 61 having a plurality of relatively spaced parallel longitudinal slots 62 therein. The hood furthermore includes a depending protecting flange or skirt 64 in right angled relation to the portion 61 and adapted to lie rearwardly of the side and top walls of the appliance B, and in endwise closely spaced relation with the adjacent end of the tube neck 13. It will be noted that this hood has the portion 61 lying above the tube neck at the extreme end thereof and also rearwardly thereof for protection against damage should the chassis tilt or be incorrectly positioned. It is noted that a plurality of slots 62 (see Figure 1) are provided in order that the hood can be connected by the bolts 51 in the most desirable position to closely space the flange or skirt 64 at the rear of the picture tube neck 13, as shown in Fig. 2.

The material of which the appliance B is made can be metal or plastic of desired rigidity and strength. If it is of thin gauged material it may be corrugated to strengthen the same. In any event, it should be sufficiently strong to support the weight of the television chassis without bending when transporting the latter. In such event the top wall portion 32 serves as a handle.

The device can be used whether or not the picture tube is connected to the chassis.

In use, the side and top portions of the chassis may be initially adjusted to the size of the chassis upon which to be used. The chassis is then pulled rearwardly from the cabinet for several inches and to the rear end is attached the appliance B. The top wall structure 32 then serves as a handle for pulling the chassis from the cabinet and supporting the chassis for transportation to the service bench or other desired location. The adjustment of top portion 32 and the side portions 30 and 31, if desired, may be accomplished after initial attachment of the appliance to the chassis frame, in order to square the side and top portions with respect to the chassis frame and picture tube screen.

It is also within contemplation of the present invention to have the appliance constructed as a permanent attachment to a television chassis but the main purpose of the present invention is for the same to serve as a tool or appliance in handling, testing and repairing television chassis so that they may be supported in the best position for servicing the various tubes and parts, in order to protect the picture tube and various parts of the chassis against damage.

Figures 3, 4, 5, 6, 7, 8:
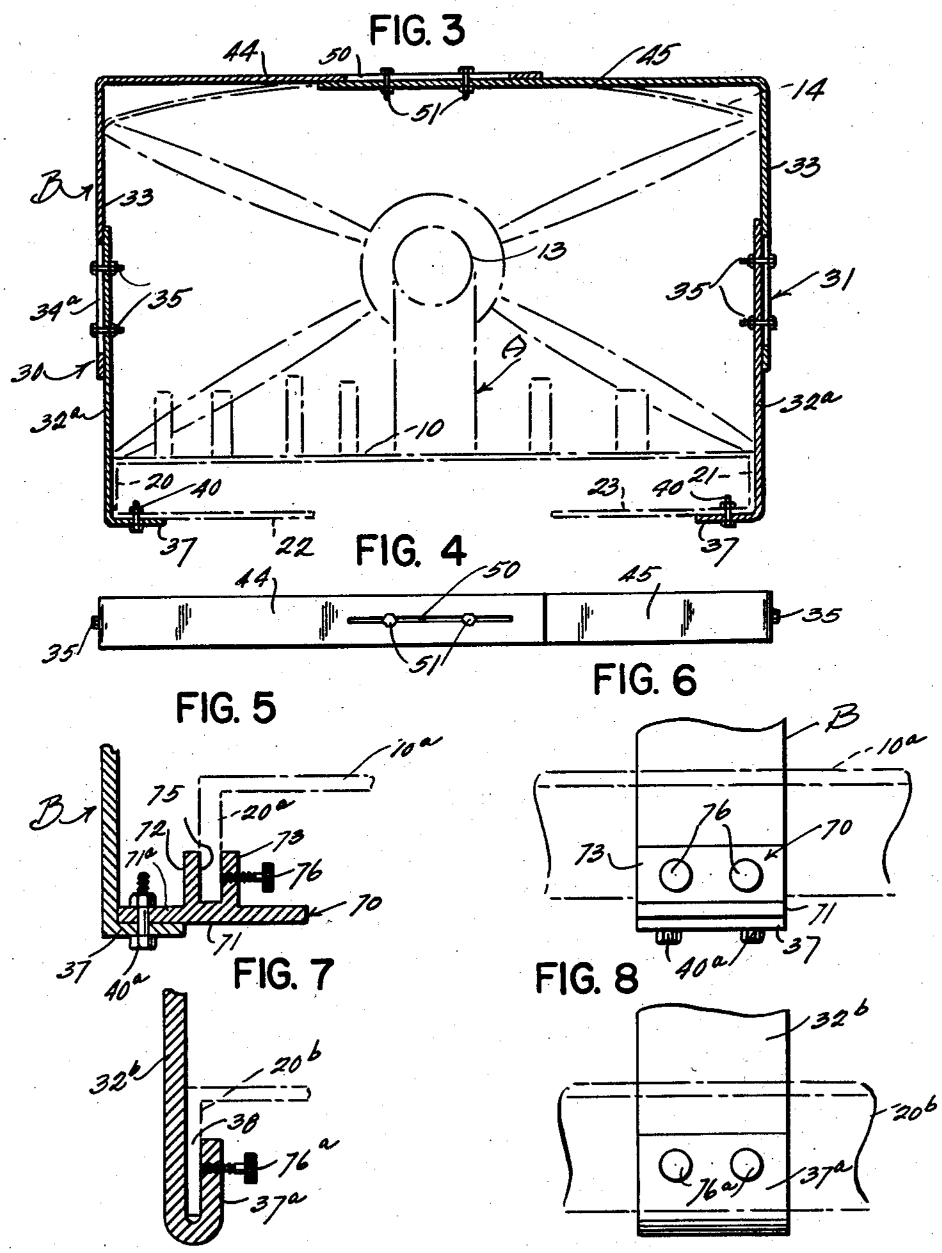
Fig. 3 is a transverse cross sectional view taken through the side and top wall structures of the appliance or tool B, without the hood, showing the associated parts thereof and in dot and dash lines showing the television chassis.
Fig. 4 is a plan view of the tool or appliance, without the picture tube protecting hood.
Fig. 5 is a fragmentary cross sectional view showing a modified mode of attachment of the appliance or tool to a television chassis frame.
Fig. 6 is a fragmentary side elevation of the details shown in Fig. 5.
Fig. 7 is a fragmentary cross sectional view of another mode of attachment of the appliance or tool to the television chassis of the frame.
Fig. 8 is an outer side elevation of the details shown in Fig. 7.

Some chassis frames, such as that shown in 10$^a$ in Figs. 5 and 6 are of sufficiently heavy gauged material that the side wall 20$^a$ thereof are not provided with bottom flanges. Under such circumstances a metal foot piece 70 will be provided. It has a base 71 and relatively spaced outstanding socket providing attaching flanges 72 and 73 to receive the flange 20$^a$ in the space 75 therebetween. One of its flanges may be provided with set screws 76 for attachment of the foot piece 70 to the flange 20$^a$ of the chassis. The base wall 70 includes a flange plate 71$^a$ extending laterally beyond the outer surface of the wall of the chassis frame wall 20$^a$. It may be provided with bolts 40$^a$ for detachable connection of the flange 37 of the appliance B, as shown in Figs. 5 and 6.

When the gauge of the material forming the appliance B is sufficiently heavy to warrant, the side wall portions 32$^b$ may be doubled, as by laterally and upwardly bending a flange 37$^a$ to provide a socket 38 to receive the chassis frame wall 20$^b$. Set screws 76$^a$ may be provided in sufficient number to clamp the socket providing lower end of the side wall portion of the appliance to the chassis frame, as shown in Figs. 7 and 8.

Various changes in the shape, size and arrangement of parts may be made to the form of invention herein shown and described, without departing from the spirit of the invention or scope of the claims.

What is claimed is:

1. In combination with a television chassis having a base frame portion and a picture tube supported thereby including a screen and neck portions, a handling and stabilizing appliance including side walls having means for detachably connecting at their lower ends with the rear end portion of the television chassis frame, said side walls when attached to the chassis extending normally vertically upwardly therefrom, and a top wall portion connected to the upper ends of the side wall portions spaced above the normal neck portion of the picture tube.

2. A structure as set forth in claim 1 in which the side wall portions and top wall portion of said appliance are each formed of a plurality of elongated parts which are relatively lengthwise adjustably connected together whereby the lengths of said side wall portions and top wall portion may be varied.

3. A structure as defined in claim 1 in which a picture tube protecting hood is provided including a rearwardly extending portion having detachable connection with the said top wall portion and including a depending skirt flange rearwardly of said top wall portion adapted to be positioned in spaced relation over the rearmost end of the picture tube.

4. In combination with a television chassis having a base frame and a picture tube supported thereby including a screen portion upstanding from the frame having side edges and a tube neck supported over the frame in spaced relation therewith, a handling and supporting means connected with the chassis frame including side wall portions connected in upstanding relation from the chassis frame at the sides thereof in position substantially aligning with the side edges of the picture tube screen, and a top wall portion connected at the upper ends of the side wall portions lying in a plane substantially level with the top edge portion of the picture tube screen.

5. In combination with a television chassis having a base frame and a picture tube supported thereby including a screen portion upstanding from the frame and a tube neck supported upon the frame in spaced relation at its rear end above the frame, a handling and supporting means connected with the chassis frame including side walls having means connected at their lower ends with the sides at the rear of the chassis and in relatively spaced relation from the picture tube neck, and a top wall portion connected to the upper ends of the side wall portions and lying in a position spaced above the picture tube neck at the rear end thereof, said spacing of said side walls and top wall with respect to the tube neck being such that a service man can insert hands or an arm therethrough for the purpose of completely lifting the chassis and tube, the said side walls and top wall being relatively narrow in width and positioned at the rear portion of the chassis.

6. A combination as called for in claim 5 wherein the side and top walls of the handling and supporting means are each composed of a plurality of elongated sections which are adjustably connected together for lengthwise adjustment of said side walls and handle and supporting means, and wherein a picture tube protecting hood is provided of inverted L-shaped formation including a top flange connected to the top wall of the handling and supporting means for lengthwise adjustment therealong and wherein said hood also includes a downwardly extending flange which extends over the rear end of the picture tube neck in protecting the spaced relation therewith.

References Cited in the file of this patent

UNITED STATES PATENTS

| | | |
|---|---|---|
| 2,543,146 | Bace | Feb. 27, 1951 |
| 2,567,996 | Gaffney | Sept. 18, 1951 |
| 2,642,566 | Regnier | June 16, 1953 |
| 2,664,258 | Lanier | Dec. 29, 1953 |